(12) United States Patent
Yokoyama et al.

(10) Patent No.: US 12,139,099 B2
(45) Date of Patent: Nov. 12, 2024

(54) SEAT BELT RETRACTOR

(71) Applicant: ASHIMORI INDUSTRY CO., LTD., Settsu (JP)

(72) Inventors: Taro Yokoyama, Settsu (JP); Satoshi Suminaka, Settsu (JP); Takayoshi Ijiri, Settsu (JP); Noriko Kurauchi, Settsu (JP); Eri Fujiwara, Settsu (JP); Daiki Hijikata, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 18/600,170

(22) Filed: Mar. 8, 2024

(65) Prior Publication Data

US 2024/0300443 A1    Sep. 12, 2024

(30) Foreign Application Priority Data

Mar. 9, 2023    (JP) ................................. 2023-036423

(51) Int. Cl.
*B60R 22/46* (2006.01)
*B60R 22/343* (2006.01)
*B60R 22/28* (2006.01)

(52) U.S. Cl.
CPC ........ *B60R 22/4676* (2013.01); *B60R 22/343* (2013.01); *B60R 2022/287* (2013.01); *B60R 22/4628* (2013.01)

(58) Field of Classification Search
CPC .............. B60R 22/4676; B60R 22/343; B60R 2022/287
See application file for complete search history.

(56) References Cited

U.S. PATENT DOCUMENTS

| | | | |
|---|---|---|---|
| 10,017,150 B2 * | 7/2018 | Asako | ...................... B60R 22/36 |
| 10,507,789 B2 * | 12/2019 | Yanagawa | ............... B60R 22/36 |
| 2023/0219520 A1 * | 7/2023 | Yokoi | ................. B60R 22/4676 |
| | | | 242/396.1 |

FOREIGN PATENT DOCUMENTS

| | | |
|---|---|---|
| JP | 5339042 B2 | 11/2013 |
| JP | 2020-104777 A | 7/2020 |

* cited by examiner

*Primary Examiner* — Faye M Fleming
(74) *Attorney, Agent, or Firm* — Sughrue Mion, PLLC

(57) ABSTRACT

A seat belt retractor includes a housing including a pair of side walls facing each other, a winding drum configured to wind up a webbing, a locking base prevented from being rotated in the pull-out direction, in an emergency of a vehicle, an impact energy absorbing member including a first end side coupled to the winding drum and a second end side coupled to the locking base, the impact energy absorbing member connecting the winding drum and the locking base so as to be integrally rotatable, in a normal state, at least one impact energy absorbing wire housed in at least one slot that is provided in the winding drum, and a stopper member configured to define an allowable amount of relative rotation between the winding drum and the locking base in a case where the impact energy absorbing member absorbs the impact energy.

5 Claims, 14 Drawing Sheets

FIG. 4
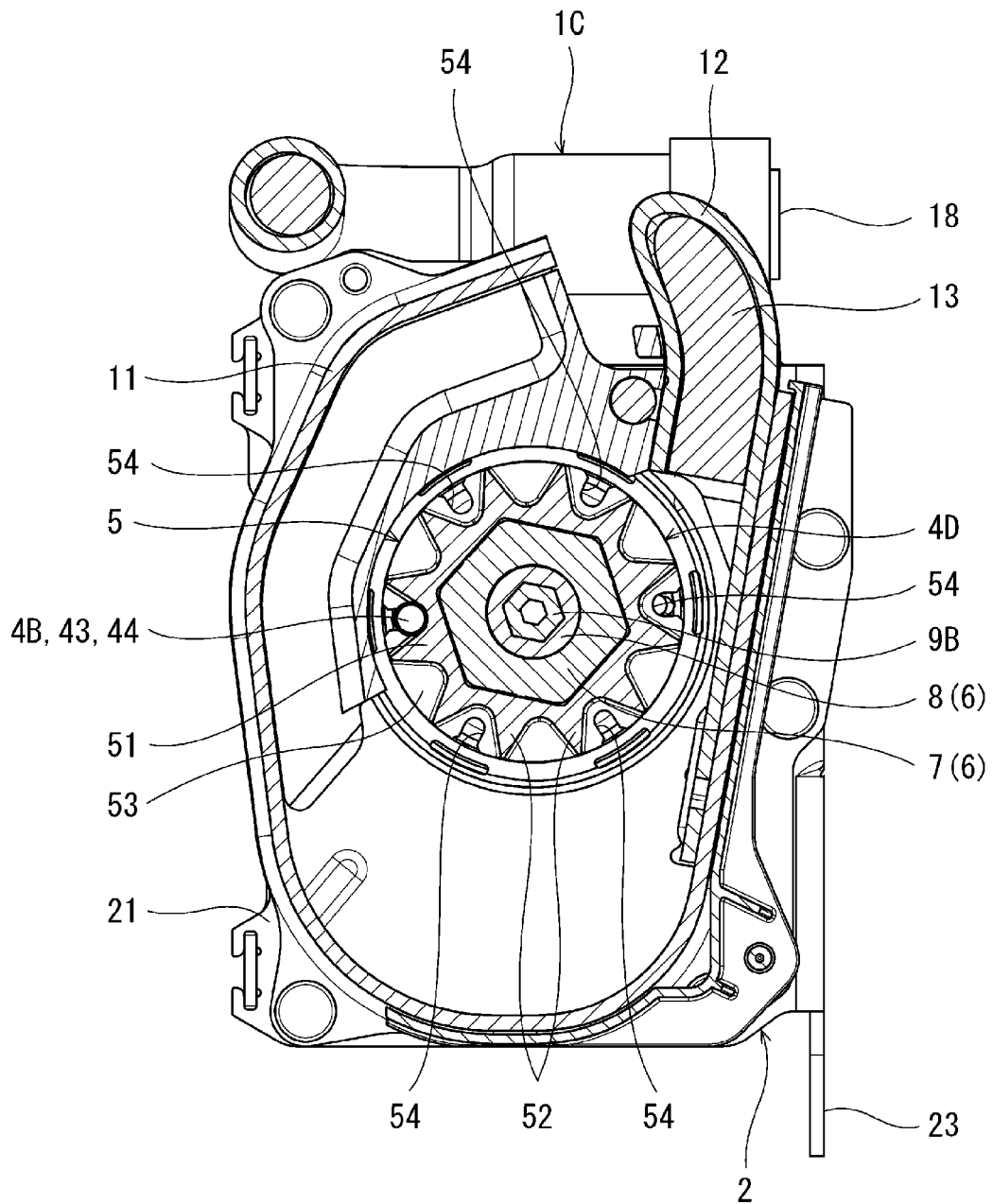
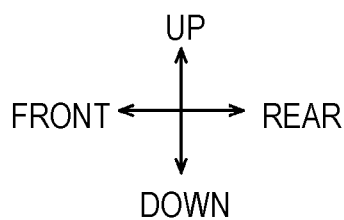

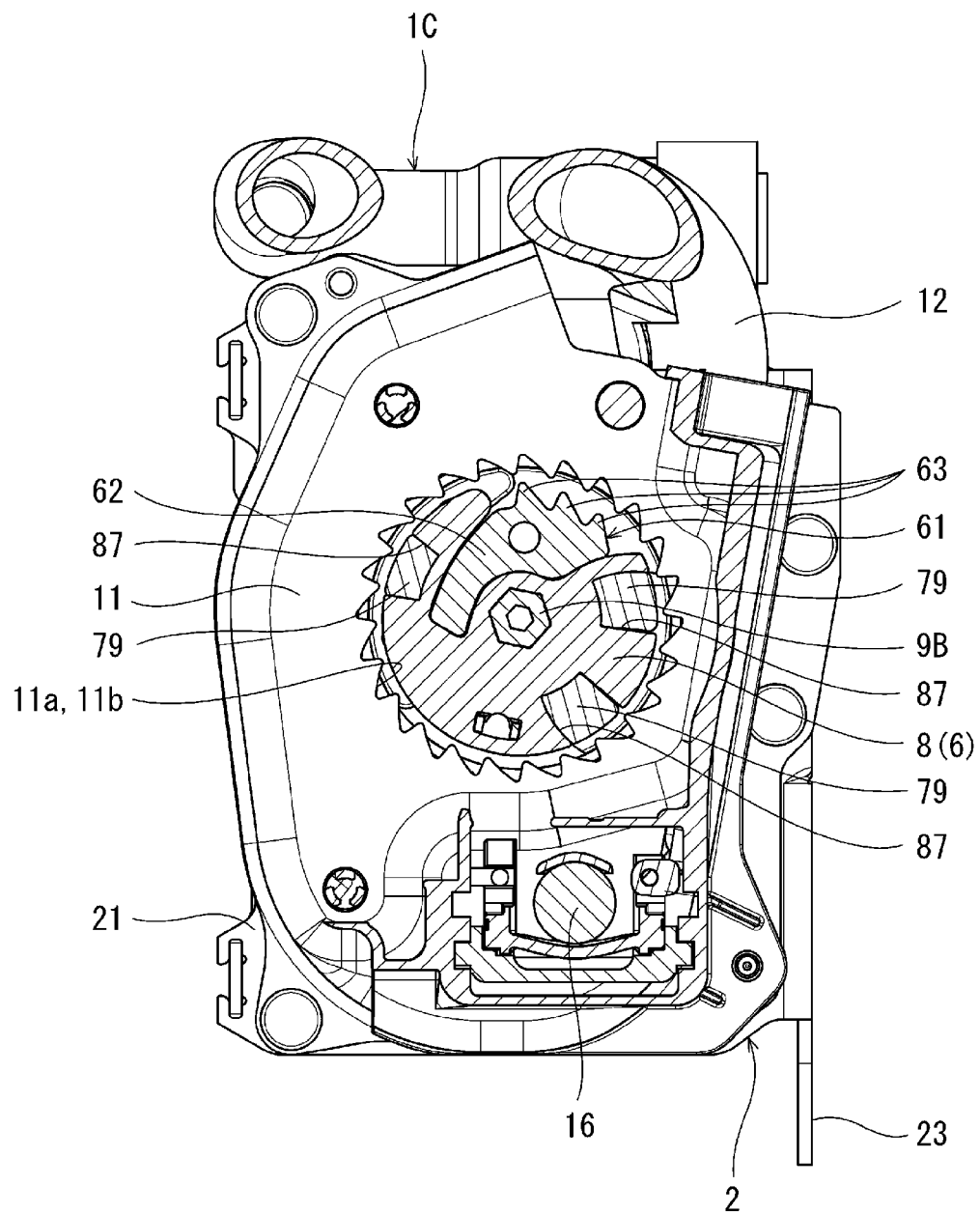
FIG. 5
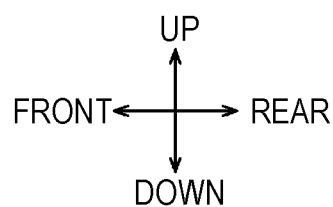

LEFT ← → RIGHT

SEAT BELT RETRACTOR

CROSS-REFERENCE TO RELATED APPLICATIONS

This application is based on and claims priority under 35 USC 119 from Japanese Patent Application No. 2023-036423 filed on Mar. 9, 2023, the entire content of which is incorporated herein by reference.

TECHNICAL FIELD

The present disclosure relates to a seat belt retractor capable of absorbing impact energy of an occupant while a webbing is pulled out, and capable of restricting a pull-out amount of the webbing, in an emergency such as vehicle collision.

BACKGROUND ART

In the related art, there is a seat belt retractor configured to prevent a webbing from being pulled out in an emergency of a vehicle. In the seat belt retractor, a winding drum configured to winds up the webbing is rotatably housed between a pair of side walls of a housing.

For example, JP5339042B discloses a seat belt retractor including a torsion bar, which is an impact energy absorbing member, and an impact energy absorbing wire (referred to as a "bending element" in JP5339042B) formed in a substantially lateral U-shape.

Specifically, in the seat belt retractor disclosed in JP5339042B, a winding drum (referred to as a "spindle" in JP5339042B) has a center hole opened to one end surface, and a locking base (referred to as a "tread head" in JP5339042B) is disposed to face the one end surface of the winding drum. The torsion bar is inserted into the center hole of the winding drum, and includes one end side, opposite to the locking base, coupled to the winding drum without being rotatable relative to the winding drum, and the other end side coupled to the locking base without being rotatable relative to the locking base. The torsion bar is configured to absorb impact energy by plastic deformation caused by twisting in an emergency of a vehicle.

The winding drum is provided with two housing grooves, which are opened in one end surface facing the locking base, at an interval of 180 degrees around a rotation center of the winding drum. The substantially lateral U-shaped impact energy absorbing member includes both end portions parallel to each other, and a central portion connecting the both end portions. The both end portions are housed in the respective housing grooves of the winding drum, in a state where proximal end portions of the both end portions on central portion sides protrude. On the other hand, the locking base is provided with two through holes as holding portions, and the proximal end portions of the both end portions of the impact energy absorbing wire are inserted into and attached to the through holes. The impact energy absorbing wire is configured to absorb the impact energy when the both end portions are pulled out while being plastically deformed from the housing grooves in the emergency of the vehicle.

Further, JP2020-104777A discloses a seat belt retractor including a torsion bar, an impact energy absorbing wire (referred to as an "energy absorbing pin" in JP2020-104777A), and a stopper member that defines an allowable amount of relative rotation between a winding drum (referred to as a "spool" in JP2020-104777A) and a locking base when a torsion bar absorbs impact energy.

The stopper member is held in a center hole of the winding drum without being rotatable relative to the winding drum and so as to be movable in an axial direction of the winding drum. The locking base includes a shaft portion coaxial with the winding drum, a male screw is formed on an outer circumferential surface of the shaft portion, and the stopper member is screwed onto the male screw. In an emergency of a vehicle, the relative rotation between the winding drum and the locking base is restricted, by a predetermined amount, by the stopper member. Accordingly, a pull-out amount of a webbing is restricted, and an occupant is prevented from moving in a forward direction beyond a predetermined distance.

In a case where the seat belt retractor includes the stopper member as in JP2020-104777A, it is desirable to adjust an initial position of the stopper member in the axial direction of the winding drum so as to adjust the pull-out amount of the webbing at the time of absorbing the impact energy. However, in the structure of JP2020-104777A, the impact energy absorbing wire extends across the winding drum and the locking base, and thus an attachment angle of the locking base with respect to the winding drum cannot be changed. If there is no impact energy absorbing wire, the initial position of the stopper member in the axial direction of the winding drum can be adjusted by changing the attachment angle of the locking base with respect to the winding drum.

Therefore, as in the locking base of the seat belt retractor of JP5339042B, it is conceivable to provide the locking base of JP2020-104777A with two holding portions at an interval of 180 degrees, and in this case, the attachment angle of the locking base with respect to the winding drum can be changed only at 180 degrees, and the pull-out amount of the webbing cannot be finely adjusted.

SUMMARY OF INVENTION

Aspect of non-limiting embodiments of the present disclosure relates to provide a seat belt retractor that is capable of finely adjusting a pull-out amount of a webbing at the time of absorbing impact energy, and that has a configuration using an impact energy absorbing wire.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a seat belt retractor including:
  a housing including a pair of side walls facing each other;
  a winding drum configured to wind up a webbing, the winding drum being housed between the pair of side walls so as to be rotatable in a winding direction and a pull-out direction of the webbing, the winding drum having a center hole opened on at least a first end surface of the winding drum;
  a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum;
  an impact energy absorbing member including one end side coupled to the winding drum and the other end side coupled to the locking base, the impact energy absorbing member connecting the winding drum and the locking base so as to be integrally rotatable, in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base;

at least one impact energy absorbing wire housed in at least one slot that is provided in the winding drum so as to form an opening in the first end surface of the winding drum, a head portion of the at least one impact energy absorbing wire that protrudes from the opening of the slot being attached to the locking base, the at least one impact energy absorbing wire being configured to be pulled out from the opening while being plastically deformed in a case where the winding drum and the locking base are relatively rotated, so as to absorb the impact energy; and a stopper member being held in the center hole of the winding drum without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy, in which the locking base includes three or more holding portions that are separated from each other in a circumferential direction around a rotation center of the winding drum, the number of the holding portions is larger than the number of slots, and the head portion of the at least one impact energy absorbing wire is attached to at least one of the holding portions.

BRIEF DESCRIPTION OF DRAWINGS

Exemplary embodiment(s) of the present invention will be described in detail based on the following figures, wherein:

FIG. 4 is a cross-sectional view taken along a line IV-IV in FIG. 3;

FIG. 5 is a cross-sectional view taken along a line V-V in FIG. 3;

DESCRIPTION OF EMBODIMENTS

Figure 1:
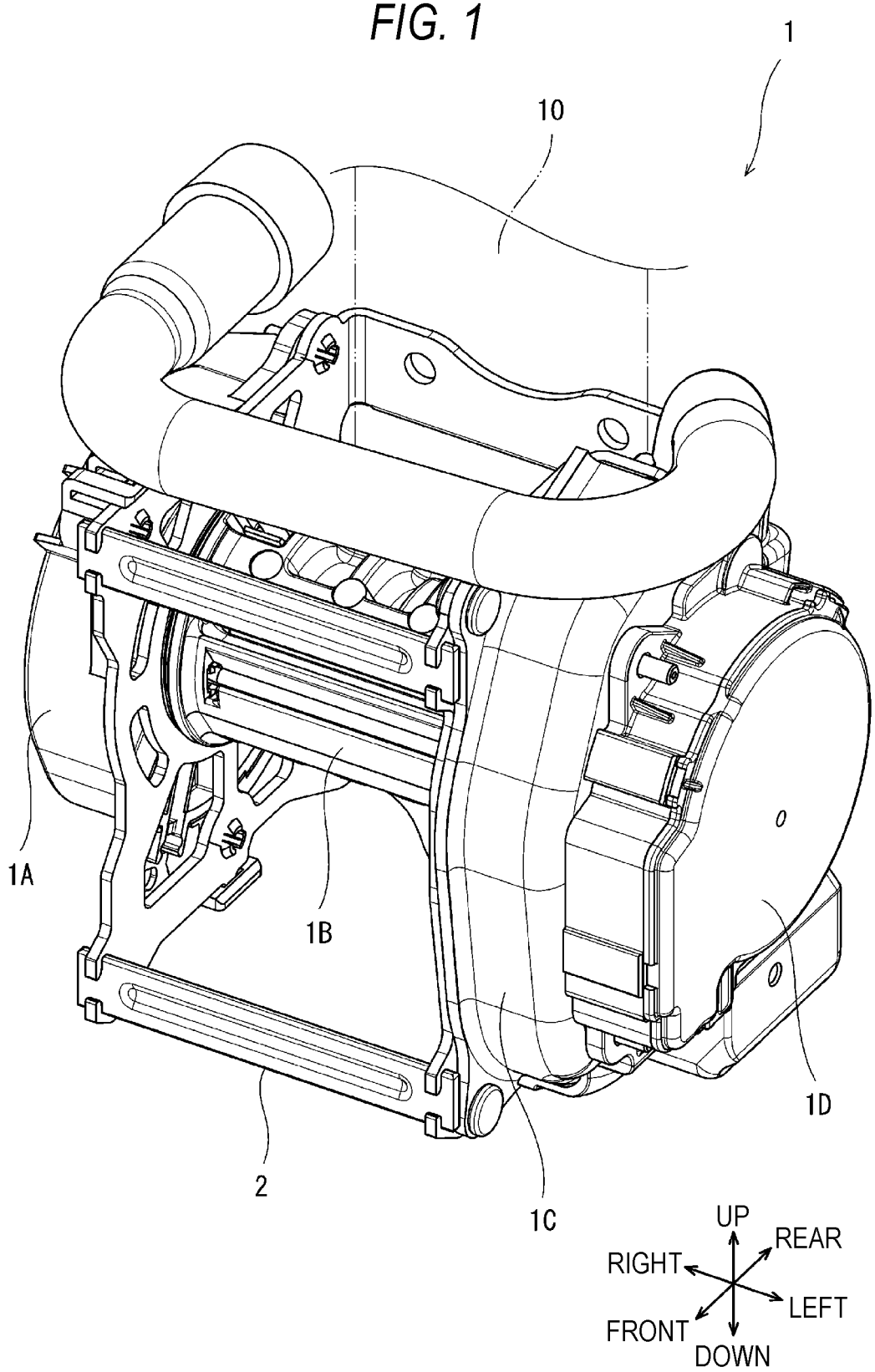
FIG. 1 is a perspective view of a seat belt retractor according to an embodiment of the present disclosure.
Figure 2:
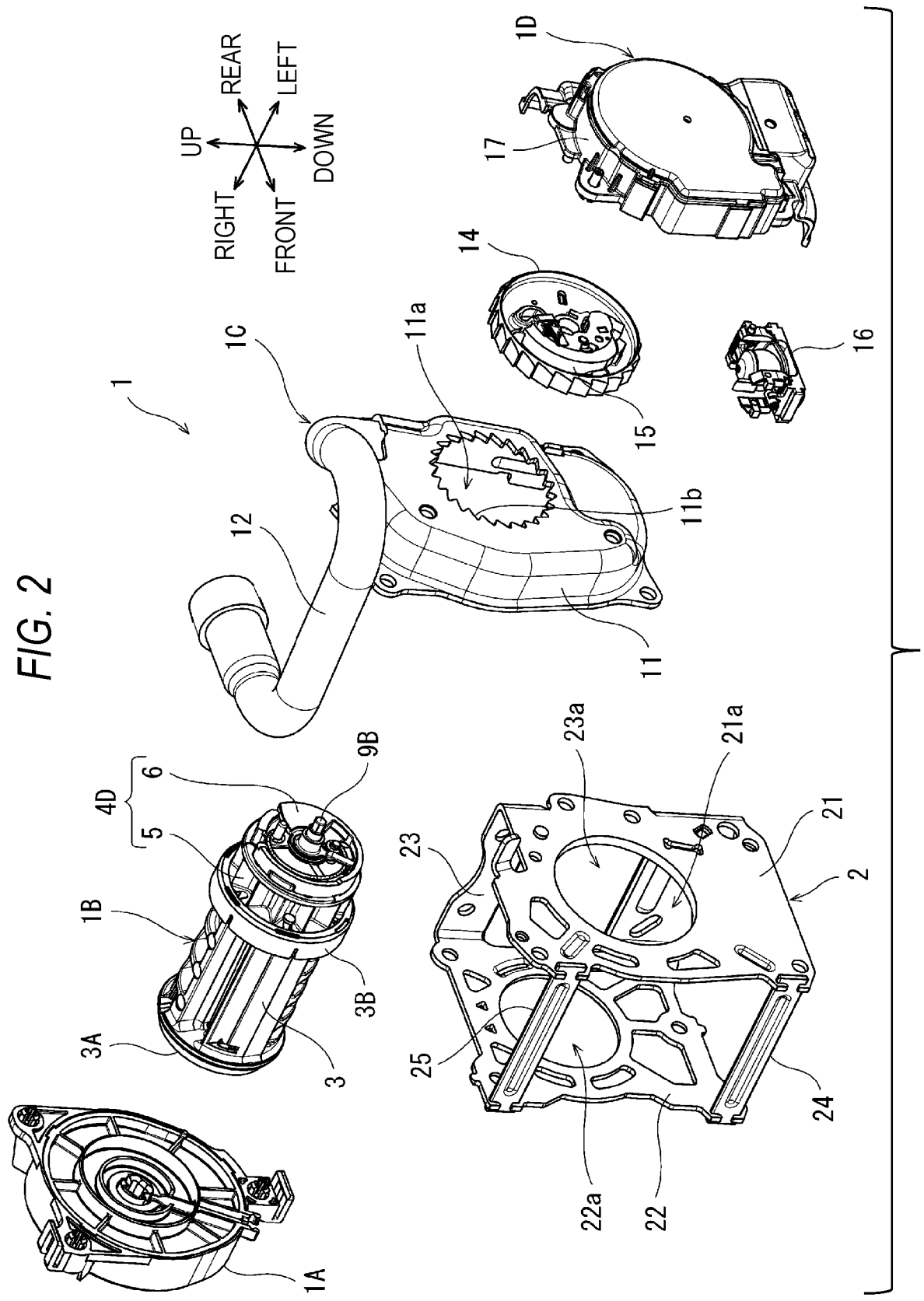
FIG. 2 is an exploded perspective view of the seat belt retractor illustrated in FIG. 1.

FIGS. 1 and 2 illustrate a seat belt retractor 1 according to an embodiment of the present disclosure. The seat belt retractor 1 is configured to prevent a webbing 10, which is a seat belt, from being pulled out in an emergency such as vehicle collision.

Specifically, the seat belt retractor 1 includes a housing 2, a winding spring unit 1A, a winding drum unit 1B, a pretensioner 1C, and a lock unit 1D. The winding drum unit 1B includes a winding drum 3 configured to wind up the webbing 10, and the housing 2 includes a first side wall 21 and a second side wall 22 that face each other in an axial direction of the winding drum 3.

The winding drum 3 is housed between the first side wall 21 and the second side wall 22 so as to be rotatable in a winding direction and a pull-out direction of the webbing 10. The housing 2 includes a back plate 23 that is formed by sheet metal processing together with the first side wall 21 and the second side wall 22, and that is perpendicular to the first side wall 21 and the second side wall 22. Hereinafter, for convenience of description, the axial direction of the winding drum 3 is referred to as a left-right direction (a first side wall 21 side is referred to as a leftward direction, and a second side wall 22 side is referred to as a rightward direction), and a thickness direction of the back plate 23 is referred to as a front-rear direction (a side of the side walls 21 and 22 is referred to as a forward direction, and an opposite side is referred to as a rearward direction). As illustrated in FIGS. 1 and 2, one side of a direction orthogonal to the left-right direction and the front-rear direction is referred to as an upward direction, and the other side of the direction orthogonal to the left-right direction and the front-rear direction is referred to as a downward direction.

Lower portions and upper portions of front sides of the first side wall 21 and the second side wall 22 of the housing 2 are connected by connecting bars 24 and 25. The first side wall 21 and the second side wall 22 are respectively provided with openings 21a and 22a through which the winding drum 3 is inserted. In addition, the back plate 23 is provided with an opening 23a through which the winding drum 3 is exposed.

The winding spring unit 1A is attached to the second side wall 22. The pretensioner 1C is attached to the first side wall 21 of the housing 2. The lock unit 1D is attached to the pretensioner 1C.

Figure 3:
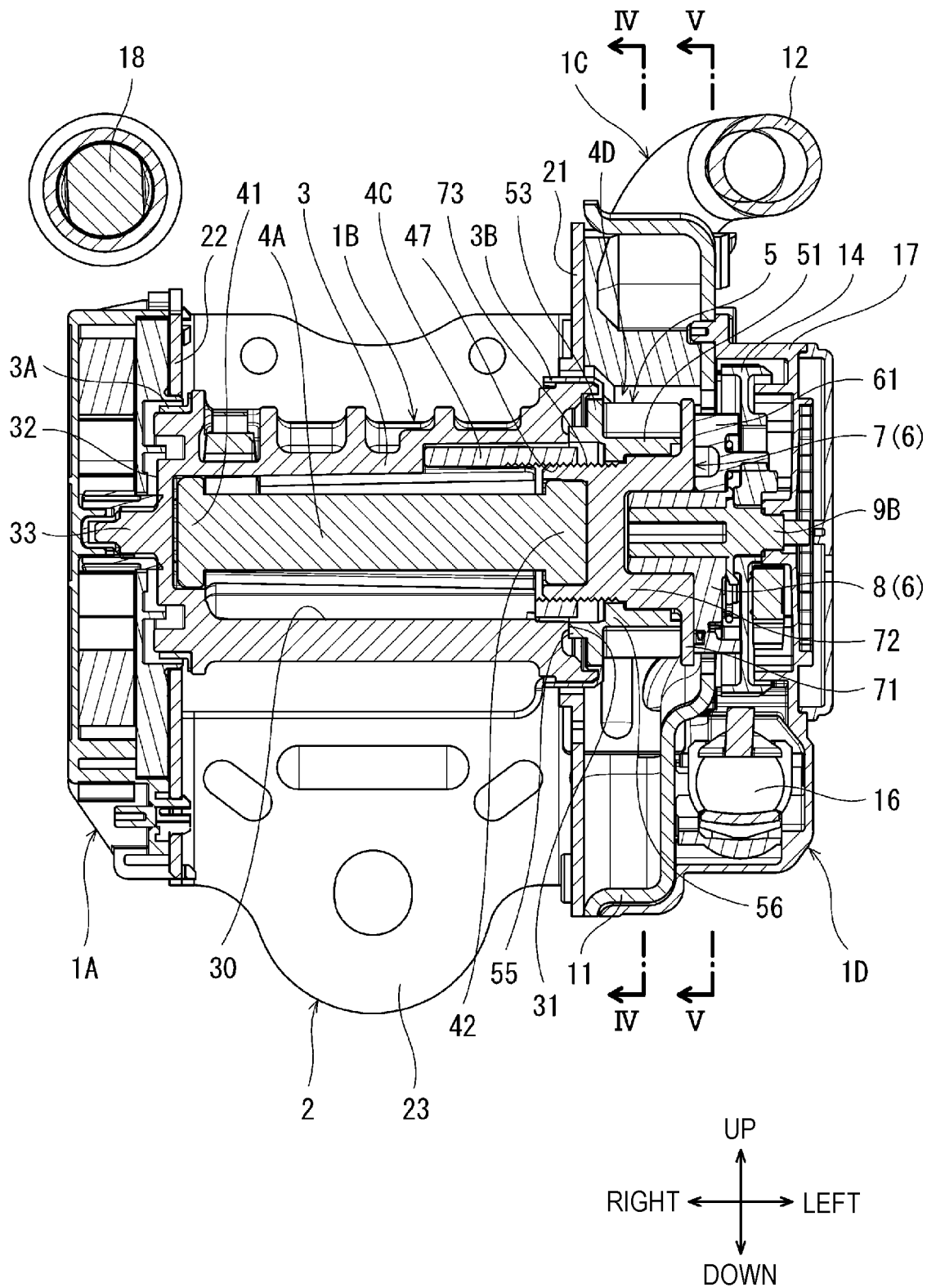
FIG. 3 is a cross-sectional view of the seat belt retractor illustrated in FIG. 1.

As illustrated in FIG. 3, the winding drum 3 includes a first end surface 31 on a side of the first side wall 21 of the housing 2, and a second end surface 32 on a side of the second side wall 22 of the housing 2. In the present embodiment, the winding drum 3 includes a shaft portion 33 that protrudes from the second end surface 32 in the rightward direction, and the shaft portion 33 is rotatably supported by the winding spring unit 1A. However, a torsion bar, which is an impact energy absorbing member 4A to be described later, may penetrate the winding drum 3, and a right end portion of the torsion bar may be rotatably supported by the winding spring unit 1A. Since a configuration of the winding spring unit 1A is known, a detailed description thereof will be omitted.

Figure 6:
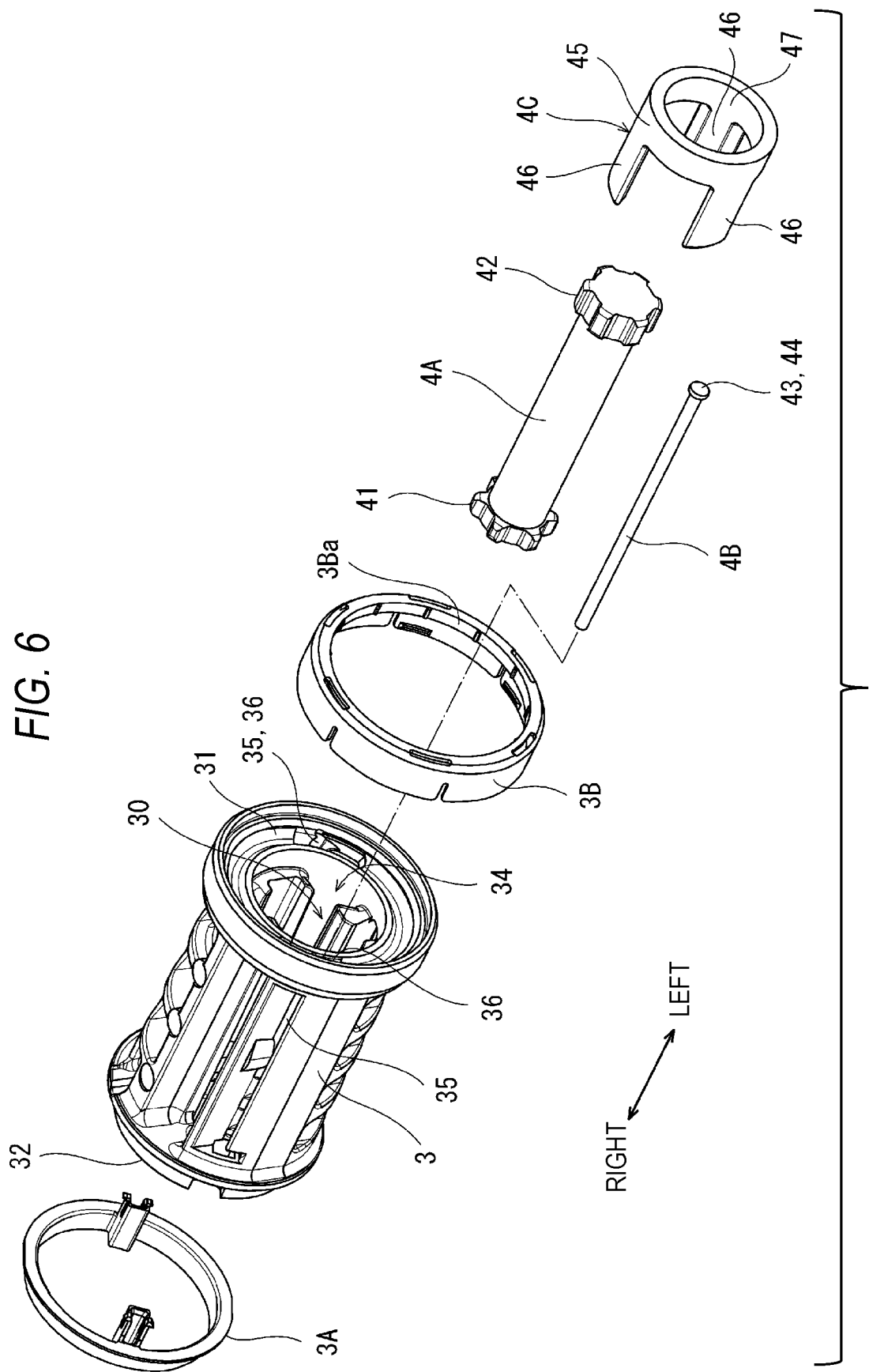
FIG. 6 is an exploded perspective view of a part of a winding drum unit.
Figure 7:
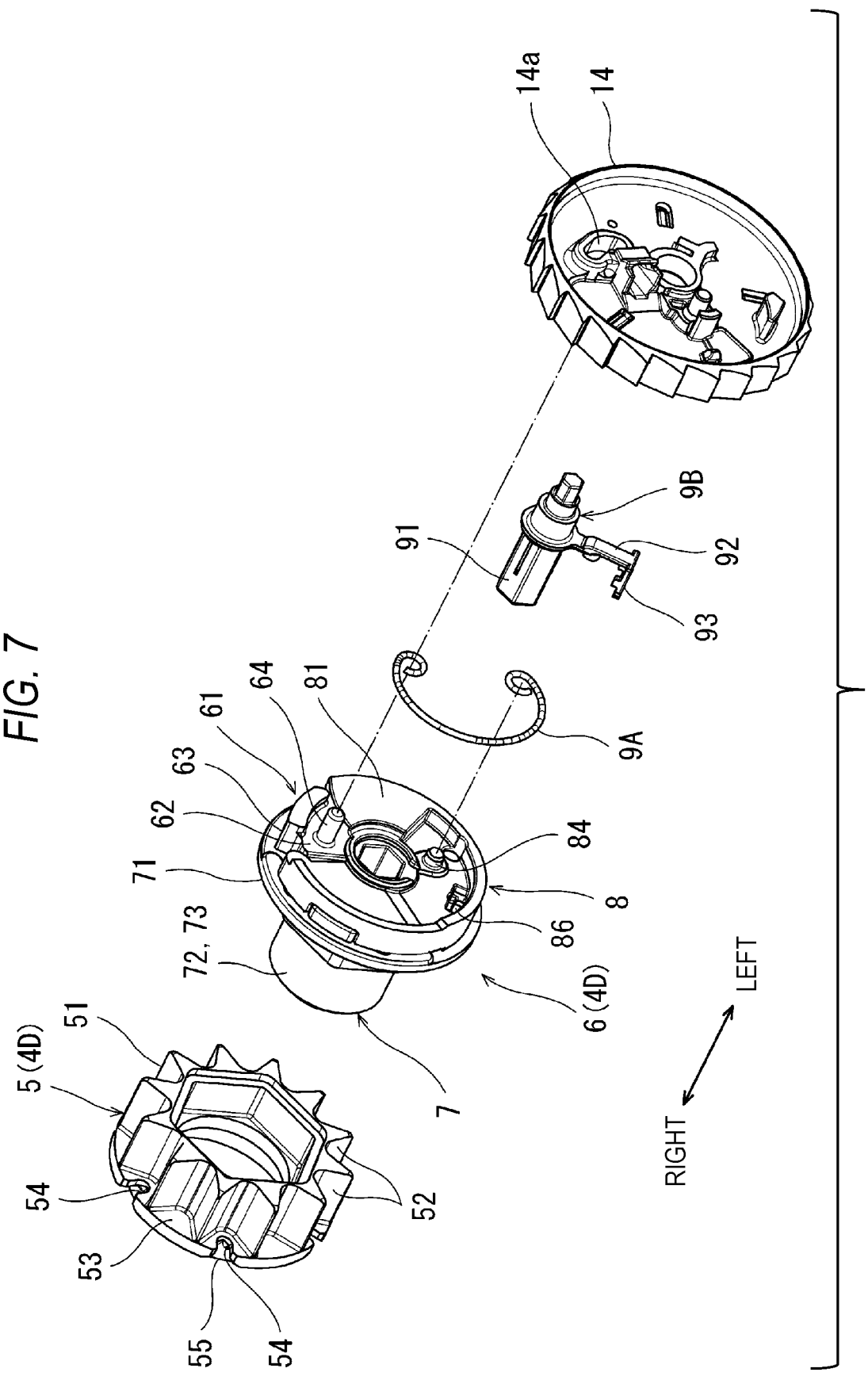
FIG. 7 is an exploded perspective view of the rest of the winding drum unit and a synchronized gear.

As illustrated in FIGS. 6 and 7, the winding drum unit 1B includes a bush 3A, a bearing 3B, the impact energy absorbing member 4A, an impact energy absorbing wire 4B, a stopper member 4C, a locking base 4D, a return spring 9A, and a rotation shaft 9B, in addition to the winding drum 3.

The locking base 4D is disposed to face the first end surface 31 of the winding drum 3, and is prevented from being rotated in the pull-out direction in the emergency of the vehicle. The locking base 4D includes a locking base main body 6, and a drive wheel 5 attached to the locking base main body 6.

The bush 3A and the bearing 3B are emergency means for smoothly rotating the winding drum 3 even when a relative position of the winding drum 3 with respect to the housing 2 is shifted in the emergency of the vehicle. As illustrated in FIG. 3, the bush 3A is attached to a right end portion of the winding drum 3, which is positioned in the opening 22a of the second side wall 22, and the bearing 3B is attached to a left end portion of the winding drum 3, which is positioned in the opening 21a of the first side wall 21. Further, the bearing 3B includes a folded portion 3Ba (see FIG. 6) that is folded back to an inner side of the left end portion of the winding drum 3, and that is configured to slide with the drive wheel 5 in a case where the winding drum 3 and the locking base 4D rotate relative to each other.

The winding drum 3 has a center hole 30 extending along a center axis of the winding drum 3. In the present embodiment, the center hole 30 is bottomed and is opened only to the first end surface 31. However, in a case where the torsion bar, which is the impact energy absorbing member 4A, penetrates the winding drum 3 as described above, the center hole 30 may be opened not only to the first end surface 31 but also to the second end surface 32.

In the present embodiment, the impact energy absorbing member 4A is the torsion bar inserted into the center hole 30 of the winding drum 3. The impact energy absorbing member 4A includes one end side, opposite to the locking base 4D, coupled to the winding drum 3 without being rotatable relative to the winding drum 3, and the other end side coupled to the locking base 4D without being rotatable relative to the locking base 4D.

More specifically, the impact energy absorbing member 4A, which is the torsion bar, includes spline-shaped coupling portions 41 and 42, on the one end side and the other end side, respectively. The bottom of the center hole 30 of the winding drum 3 includes a spline-shaped recess for coupling with the coupling portion 41, and the coupling portion 41 is fitted into the recess.

The impact energy absorbing member 4A connects the winding drum 3 and the locking base 4D so as to be integrally rotatable in a normal state. And the impact energy absorbing member 4A is configured to be plastically deformed in a case where a pull-out force of the webbing 10 exceeds a predetermined value in a state where the locking base 4D is prevented from being rotated in the pull-out direction, so as to absorb impact energy while allowing the relative rotation between the winding drum 3 and the locking base 4D.

Figure 8:
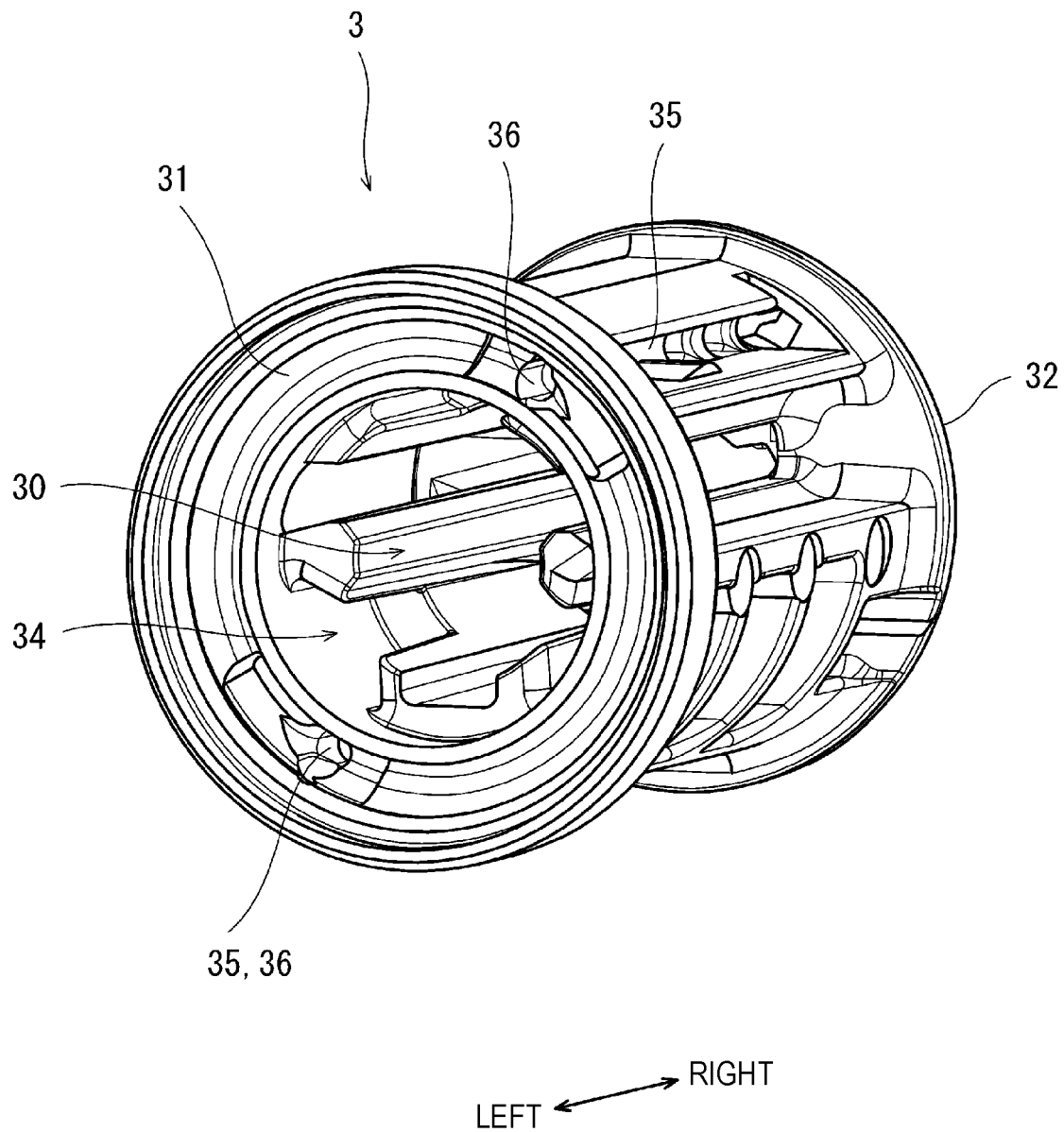
FIG. 8 is a perspective view of a winding drum.

The impact energy absorbing wire 4B is configured to absorb impact energy at an initial stage when the winding drum 3 and the locking base 4D rotate relative to each other. In the present embodiment, as illustrated in FIG. 8, the winding drum 3 includes two slots 35 that are opened in the first end surface 31. In the present embodiment, although each slot 35 has a groove shape recessed obliquely from an outer circumferential surface of the winding drum 3, and the slot 35 may be a hole extending in the axial direction of the winding drum 3.

The impact energy absorbing wire 4B is housed in one of the slots 35 in a state where a head portion 43 (see FIG. 6) protrudes from an opening 36 of the slot 35. The head portion 43 of the impact energy absorbing wire 4B is attached to the locking base 4D. The impact energy absorbing wire 4B is configured to be pulled out from the opening 36 while being plastically deformed in a case where the winding drum 3 and the locking base 4D are relatively rotated, so as to absorb the impact energy.

The stopper member 4C defines an allowable amount of the relative rotation between the winding drum 3 and the locking base 4D in a case where the impact energy absorbing member 4A absorbs the impact energy. The stopper member 4C is held in the center hole 30 of the winding drum 3 without being rotatable relative to the winding drum 3 and so as to be movable in the left-right direction.

As illustrated in FIG. 6, the stopper member 4C has a tubular shape through which the impact energy absorbing member 4A, which is the torsion bar, is inserted. The stopper member 4C is formed with a female screw 47 on an inner circumferential surface of the stopper member 4C.

In the present embodiment, the stopper member 4C is configured to be inserted into the center hole 30 of the winding drum 3, in a plurality of attachment postures in which the stopper member 4C is rotated at a predetermined angular interval α. More specifically, the stopper member 4C includes an annular portion 45 and three claw portions 46 that protrude from the annular portion 45 in the rightward direction. On the other hand, the center hole 30 of the winding drum 3 includes three guide grooves 34. Since the respective three claw portions 46 are fitted into the three guide grooves 34, the stopper member 4C is held by the winding drum 3 without being rotatable relative to the winding drum 3 and so as to be movable in the left-right direction. In addition, the three claw portions 46 and the three guide grooves 34 are provided at equal angular intervals, and thus the stopper member 4C is configured to be inserted into the center hole 30 of the winding drum 3 at any angular position as long as positions of the claw portions 46 and the guide grooves 34 coincide with each other. That is, the above predetermined angular interval α is 120 degrees, and the number of attachment postures of the stopper member 4C is three.

The number of claw portions 46 and the number of guide grooves 34 can be changed, and in this case, the predetermined angular interval α and the number of attachment postures of the stopper member 4C change according to the number of claw portions 46 and the number of guide grooves 34. In addition, instead of the stopper member 4C including the claw portions 46, a cross-sectional shape of an outer shape of the stopper member 4C and a cross-sectional shape of a left end portion of the center hole 30 of the winding drum 3 may be polygonal. Alternatively, the stopper member 4C may be inserted into the center hole 30 of the winding drum 3 only in one attachment posture.

Figure 9:
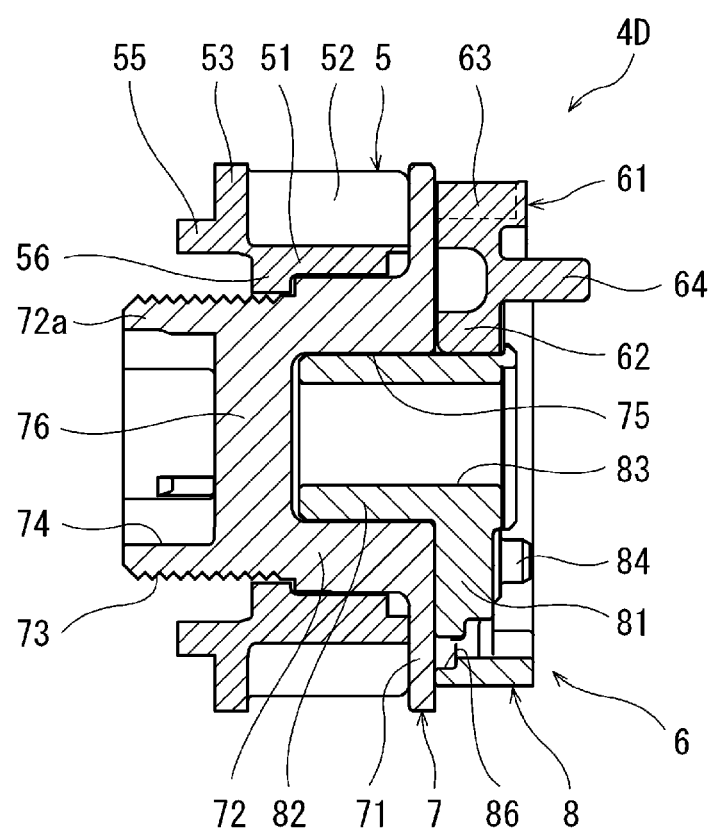
FIG. 9 is a cross-sectional view of a locking base.

As illustrated in FIGS. 3 and 9, the locking base 4D includes a shaft portion 72a that protrudes from the drive wheels 5 in the rightward direction and that is coaxial with the winding drum 3, and a male screw 73 onto which the female screw 47 of the stopper member 4C is screwed is formed on an outer circumferential surface of the shaft portion 72a. In the present embodiment, as illustrated in FIG. 3, during the relative rotation between the winding drum 3 and the locking base 4D, the stopper member 4C moves from a position at which the stopper member 4C is separated from the drive wheel 5 to a position at which the stopper member 4C comes into contact with the drive wheel 5, whereby the relative rotation between the winding drum 3 and the locking base 4D is restricted to a predetermined amount.

Figure 10:
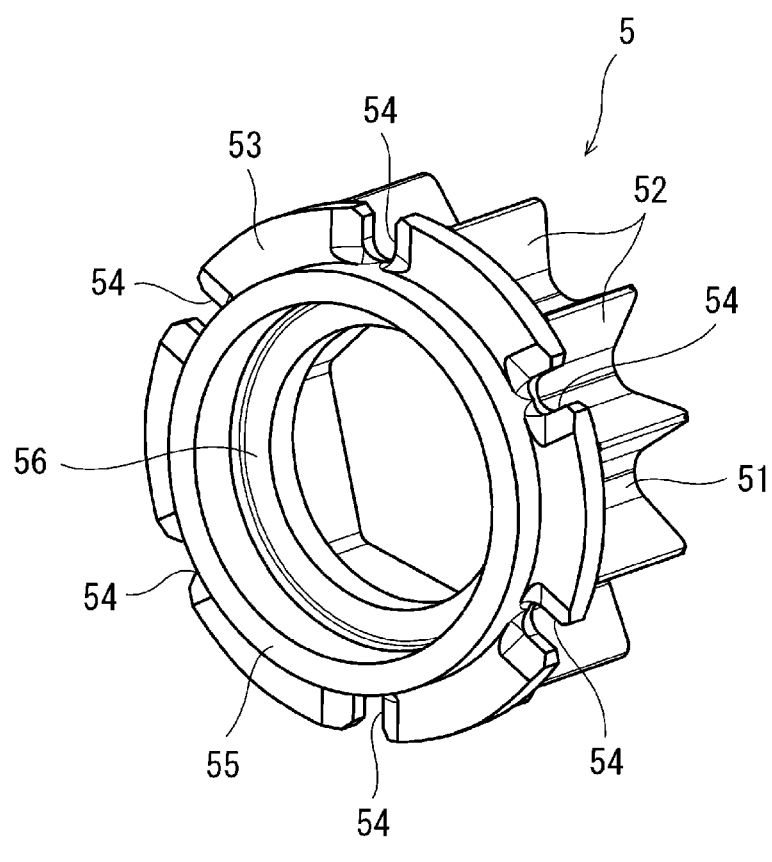
FIG. 10 is a perspective view of a drive wheel.

As illustrated in FIGS. 7 and 10, the drive wheel 5 includes a main body portion 51 having a fitting hole with a hexagonal cross-sectional shape, a plurality of teeth 52 formed on an outer circumferential surface of the main body portion 51, an annular flange 53 that protrudes outward in a radial direction from the main body portion 51 on a right side of the teeth 52, and a ring-shaped rib 55 that protrudes from the flange 53 in the rightward direction.

As illustrated in FIG. 3, the flange 53 of the drive wheel 5 faces the first end surface 31 of the winding drum 3. The flange 53 includes a plurality of holding portions 54 separated from each other in a circumferential direction around a rotation center of the winding drum 3. The number of holding portions 54 is larger than the number of slots 35 and is three or more.

In the present embodiment, six holding portions 54 are provided at equal angular intervals. That is, an angular interval β at which the holding portions 54 are separated from each other is 60 degrees. The head portion 43 of the impact energy absorbing wire 4B is attached to one of the holding portions 54. As described above, in the present embodiment, the angular interval α related to the attachment postures of the stopper member 4C is 120 degrees, and thus the angular interval β of the holding portions 54 is smaller than the angular interval α.

In the present embodiment, the holding portions 54 are grooves that are opened outward in the radial direction. The head portion 43 of the impact energy absorbing wire 4B includes a coming-off prevention portion 44 (see FIG. 6) that is located on a side of the flange 53 opposite to the winding drum 3, and that has a width larger than that of the groove that is the holding portion 54.

As illustrated in FIG. 3, in the present embodiment, the drive wheel 5 comes into contact with the first end surface 31 of the winding drum 3 via the rib 55. The impact energy absorbing wire 4B is pulled out from the opening 36 of the slot 35 while being wound around the rib 55. In a case where the winding drum 3 and the locking base 4D are rotated relative to each other, the winding drum 3 and the drive wheel 5 rotate relative to each other while the rib 55 of the drive wheel 5 comes into contact with the first end surface 31 of the winding drum 3 in the axial direction of the winding drum 3, and while an outer circumference of the flange 53 of the drive wheel 5 comes into contact with the folded portion 3Ba of the bearing 3B attached to the winding drum 3 in a radial direction of the winding drum 3.

Further, an annular flange 56 protrudes from an inner circumferential surface of the main body portion 51. The flange 56 is a portion that comes into contact with the stopper member 4C. In this way, it is possible to secure a large contact area between the flange 56 and the stopper member 4C by bringing the stopper member 4C into contact with the flange 56 of the drive wheel 5, instead of a stepped portion of the locking base main body 6.

The pretensioner 1C is configured to rotate the winding drum 3 in the winding direction, via the drive wheel 5, the locking base main body 6, and the impact energy absorbing member 4A, in the emergency of the vehicle. As illustrated in FIGS. 2 to 4, the pretensioner 1C includes a pretensioner casing 11 attached to the first side wall 21 of the housing 2, a pipe 12 extending from the pretensioner casing 11 while being bent, a moving member 13 disposed in the pipe 12, and a gas generator 18 disposed in a distal portion of the pipe 12.

In the present embodiment, the moving member 13 has a rod shape, and is plastically deformed by the digging of the teeth 52 of the drive wheel 5. However, the moving member 13 may be implemented by a plurality of divided bodies (for example, spheres) arranged at the same pitch as the teeth 52 of the drive wheel 5. In the emergency of the vehicle, the moving member 13 is engaged with the teeth 52 of the drive wheel 5 while being pushed out from the pipe 12 by gas generated in the gas generator 18, and rotates the drive wheel 5 in the winding direction. As the drive wheel 5 is rotated, the locking base main body 6, the impact energy absorbing member 4A, and the winding drum 3 are also rotated. After the pretensioner 1C is activated, the moving member 13 is prevented from being pushed back into the pipe 12 by a pressure of the gas in the pipe 12, and thus the drive wheel 5 is prevented from being rotated in the pull-out direction.

As illustrated in FIGS. 2 and 5, the pretensioner casing 11 is provided with an opening 11a through which the locking base main body 6 is inserted, and the opening 11a has internal teeth 11b formed on a circumferential edge of the opening 11a. On the other hand, the locking base main body 6 includes a lock member 61 configured to be engageable with the internal teeth 11b. The lock member 61 is engaged with the internal teeth 11b to prevent the locking base 4D from being rotated in the pull-out direction, in the emergency of the vehicle.

Figure 11:
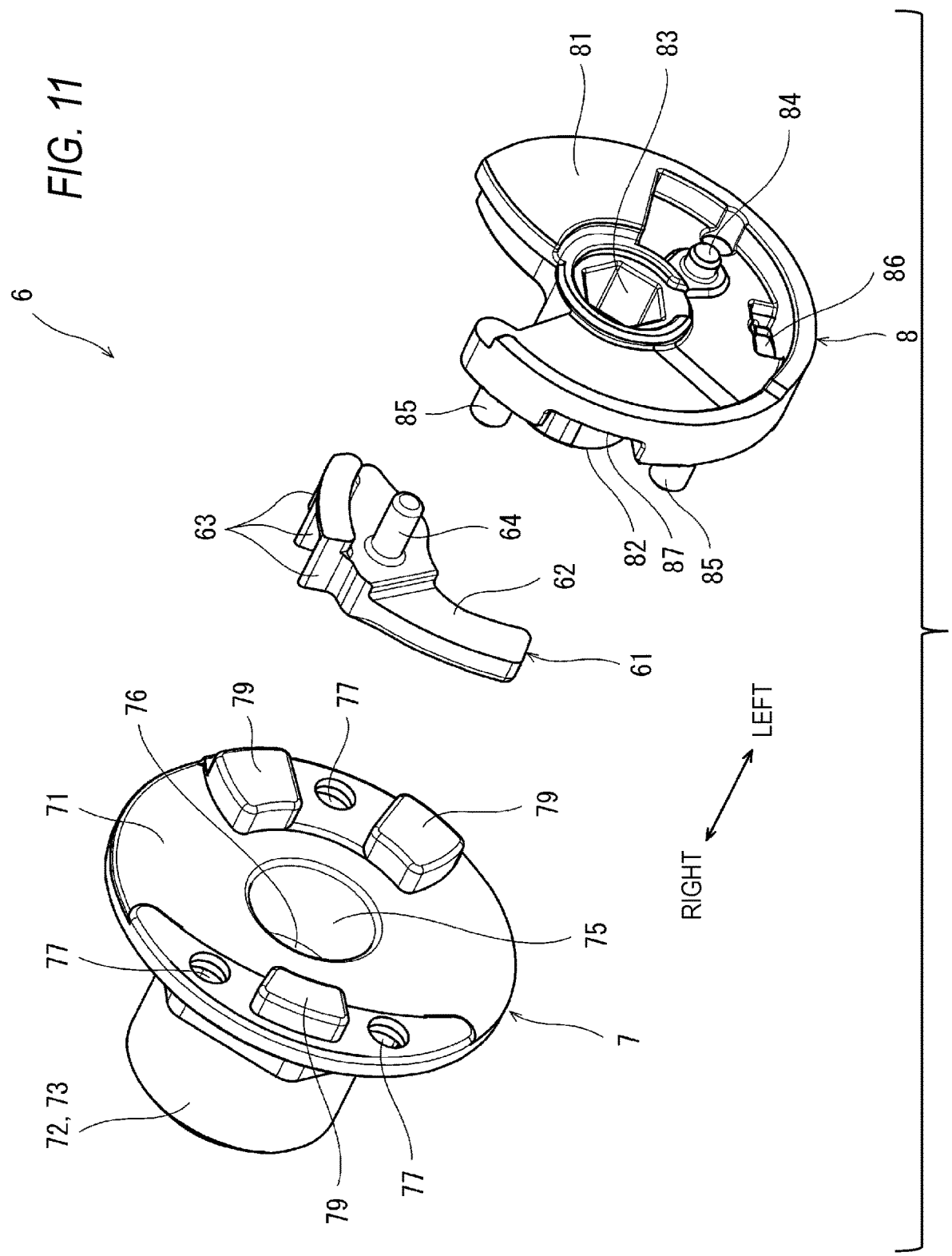
FIG. 11 is an exploded perspective view of a locking base main body and a lock member.
Figure 12:
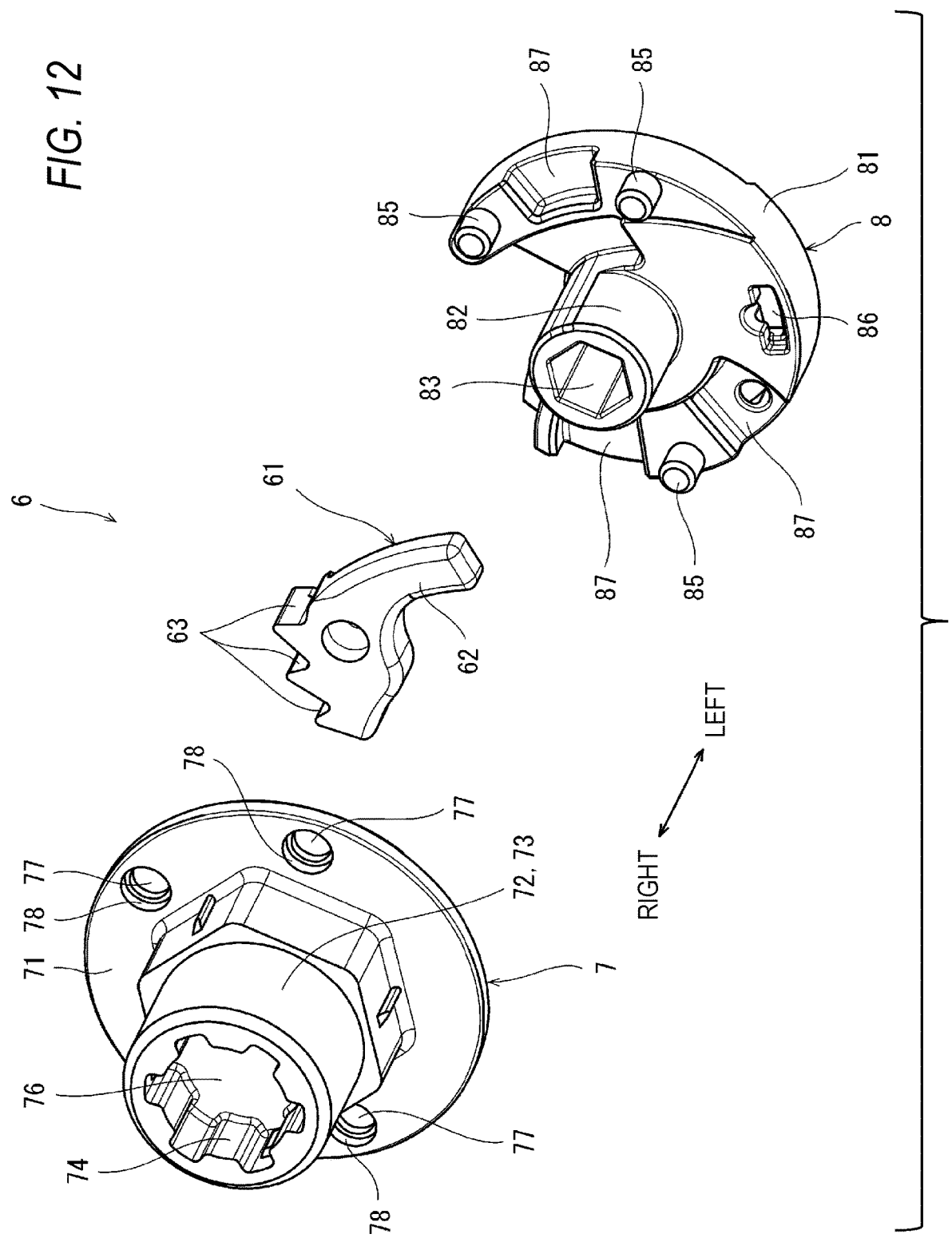
FIG. 12 is an exploded perspective view of the locking base main body and the lock member as viewed from an opposite side.

As illustrated in FIGS. 9, 11, and 12, the locking base main body 6 includes a first base member 7 to which the drive wheel 5 is attached, and a second base member 8 which is attached to the first base member 7 on a side of the first base member 7 opposite to the winding drum 3 without being rotatable relative to the first base member 7. The lock member 61 is held between the first base member 7 and the second base member 8.

More specifically, the first base member 7 includes a disk-shaped first main body portion 71, and a protruding portion 72 that protrudes from the first main body portion 71 in the rightward direction. As illustrated in FIG. 3, the drive wheel 5 is disposed between the first main body portion 71 and the first end surface 31 of the winding drum 3, and the protruding portion 72 penetrates the drive wheel 5. A right side portion of the protruding portion 72 with respect to the flange 56 of the drive wheel 5 configures the shaft portion 72a of the locking base 4D.

A proximal end portion of the protruding portion 72 is formed to have a hexagonal cross-sectional shape. The fitting hole of the main body portion 51 of the drive wheel 5 is also formed to have a hexagonal cross section, and by fitting the proximal end portion into the fitting hole, the drive wheel 5 is attached to the first base member 7 without being rotatable relative to the first base member 7. The male screw 73 is formed on an outer circumferential surface of a distal end side of the protruding portion 72.

The first base member 7 includes a first recess 74 that is recessed from a distal end surface of the protruding portion 72, and a second recess 75 that is coaxial with the first recess 74 and that is recessed from a surface of the first main body portion 71 on a side opposite to the drive wheel 5. The first recess 74 is a spline-shaped recess for coupling with the coupling portion 42 of the impact energy absorbing member 4A, and the coupling portion 42 is fitted into the first recess 74. In the present embodiment, the second recess 75 has a circular cross-sectional shape. In the present embodiment, the first base member 7 includes a partition 76 that separates the first recess 74 and the second recess 75. That is, the first recess 74 and the second recess 75 are bottomed.

The second base member 8 includes a plate-shaped second main body portion 81 that overlaps the first main body portion 71, and a fitting protrusion 82 that protrudes from the second main body portion 81 in the rightward direction. In the present embodiment, the second main body portion 81 includes three engagement concave portions 87, and by engaging three engagement convex portions 79 provided on the first main body portion 71 with the respective engagement concave portions 87, the second base member 8 is attached to the first base member 7 without being rotatable relative to the first base member 7. The fitting protrusion 82 has a circular cross-sectional shape, and the fitting protrusion 82 is fitted into the second recess 75. However, the second recess 75 and the fitting protrusion 82 may have a non-circular cross sectional shape, and by fitting the fitting protrusion 82 into the second recess 75, the second base member 8 may be attached to the first base member 7 without being rotatable relative to the first base member 7. In this case, the engagement concave portions 87 and the engagement convex portions 79 may be omitted.

In the present embodiment, the second main body portion 81 of the second base member 8 includes three crimping protrusions 85 protruding in the rightward direction, whereas the first main body portion 71 of the first base member 7 is provided with three through holes 77 through which the crimping protrusions 85 are inserted. A crimping concave portion 78 that is coaxial with the through hole 77 and that has a larger diameter than the through hole 77 is formed on a side of the first main body portion 71 opposite to the second main body portion 81. A portion of each crimping protrusion 85, which protrudes from the through hole 77, is crimped to have a larger diameter than the through hole 77 in the crimping concave portion 78 and to have an outer diameter substantially equal to an inner diameter of the crimping concave portion 78 (in FIGS. 11 and 12, the crimping protrusion 85 is drawn in a shape before crimping).

The lock member 61 includes a substantially arc-shaped and plate-shaped main body portion 62 that is held by the first main body portion 71 of the first base member 7 and the second main body portion 81 of the second base member 8, a plurality of (three in the illustrated example) engaging teeth 63 which are formed on an outer side surface of the main body portion 62 and which are configured to be engageable with the internal teeth 11b, and an operation shaft 64 that protrudes from the main body portion 62 in the leftward direction.

The second main body portion 81 of the second base member 8 includes a pin 84 that protrudes in the leftward direction. The return spring 9A has a substantially arc shape as illustrated in FIG. 7, and the return spring 9A includes one end engaged with the operation shaft 64 of the lock member 61, and the other end engaged with the pin 84. The return spring 9A is configured to maintain the lock member 61 at a non-engagement position illustrated in FIG. 13A.

The second base member 8 is provided with an engagement hole 83 that is coaxial with the fitting protrusion 82 and that is opened in the leftward direction. In the present embodiment, the engagement hole 83 penetrates the second base member 8, and is also opened in the rightward direction. The engagement hole 83 has a hexagonal cross-sectional shape.

The lock member 61 is operated by a synchronized gear 14 (see FIGS. 2 and 7). As illustrated in FIG. 2, the lock unit 1D includes a cover member 17 that houses the synchronized gear 14 and a vehicle sensor 16. The synchronized gear 14 includes a webbing sensor 15. The webbing sensor 15 is configured to be activated in a case where the webbing 10 is rapidly pulled out, whereby the synchronized gear 14 is prevented from being rotated in the pull-out direction. The vehicle sensor 16 is configured to be activated in a case where an acceleration of the vehicle changes largely, whereby the synchronized gear 14 is prevented from being rotated in the pull-out direction.

Figure 13A:
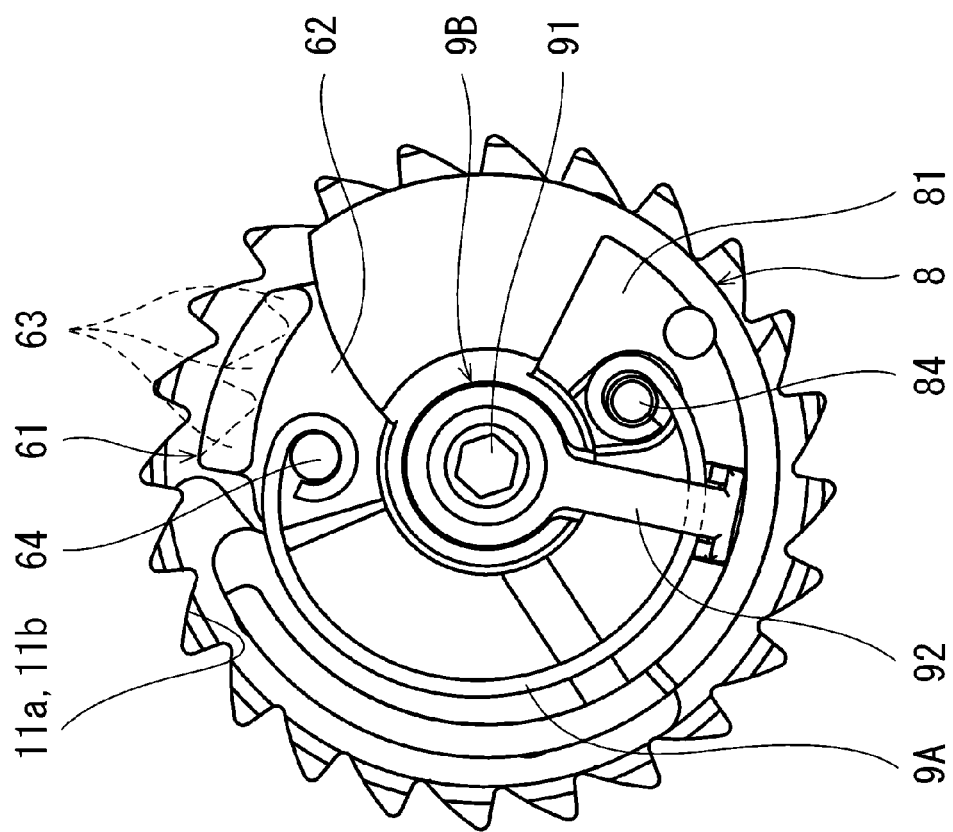
FIG. 13A illustrates a state of a return spring when the lock member is located at a non-engagement position.
Figure 13B:
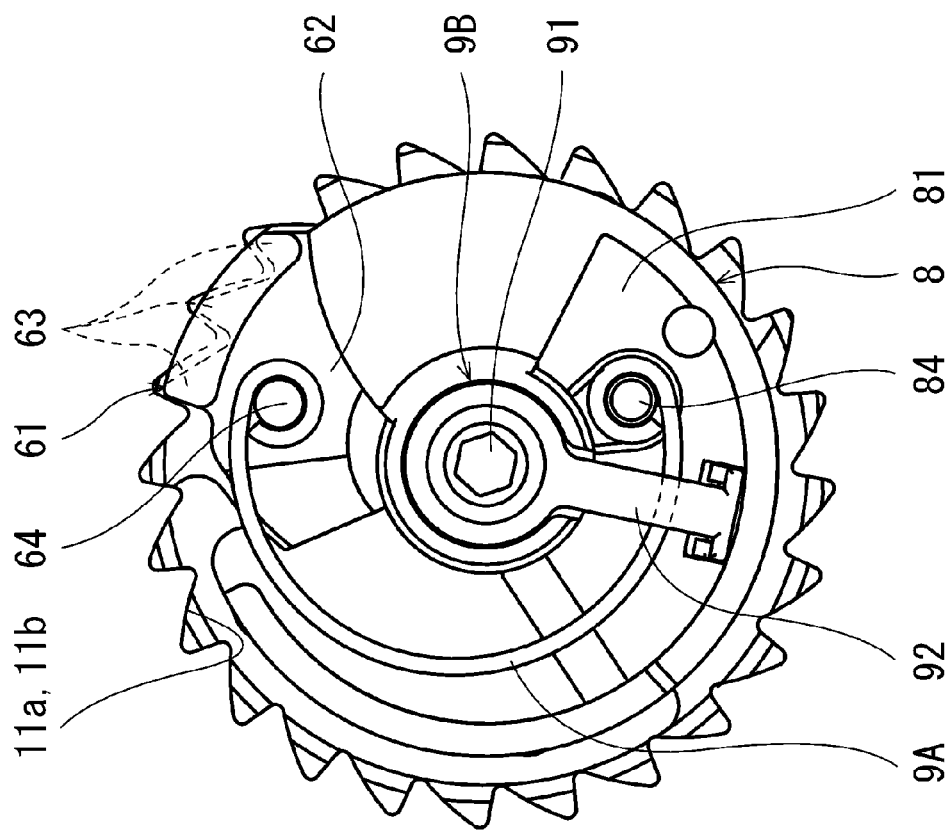
FIG. 13B illustrates a state of the return spring when the lock member is located at an engagement position.

In a case where the synchronized gear 14 is prevented from being rotated in the pull-out direction, the locking base 4D is rotated relative to the synchronized gear 14 together with the winding drum 3, and the operation shaft 64 of the lock member 61 is operated in a guide hole 14a (see FIG. 7) of the synchronized gear 14, whereby the lock member 61 moves from the non-engagement position illustrated in FIG. 13A to an engagement position illustrated in FIG. 13B.

As illustrated in FIG. 7, the rotation shaft 9B includes a rod-shaped main body portion 91, and an arm 92 extending outward from the main body portion 91 in the radial direction. A right side portion of the main body portion 91 has a hexagonal cross-sectional shape, and the right side portion is fitted into and engaged with the engagement hole 83 of the second base member 8. The arm 92 is for restraining the return spring 9A, and a hook 93 provided at a distal end of the arm 92 is engaged with an engagement hole 86 provided in the second main body portion 81 of the second base member 8. As illustrated in FIG. 3, a left side portion of the rotation shaft 9B penetrates the synchronized gear 14 and is rotatably supported by the cover member 17 of the lock unit 1D.

As described above, in the seat belt retractor 1 according to the present embodiment, the locking base 4D includes the holding portions 54 for the impact energy absorbing wire 4B in a number larger than the number of slots 35, and thus it is possible to select which holding portion 54 the impact energy absorbing wire 4B is attached to.

Moreover, three or more holding portions 54 are provided, and thus an attachment angle of the locking base 4D with respect to the winding drum 3 can be changed at an angle of less than 180 degrees (60 degrees in the present embodiment). In other words, by selecting the holding portion 54 to which the impact energy absorbing wire 4B is to be attached, an initial position of the stopper member 4C can be adjusted at a pitch corresponding to the angular interval of the holding portions 54. Therefore, a pull-out amount of the webbing 10 at the time of absorbing the impact energy can be finely adjusted.

In the present embodiment, a change interval of an attachment angle of the stopper member 4C with respect to the winding drum 3 is 120 degrees, whereas a change interval of the attachment angle of the locking base 4D with respect to the winding drum 3 when one of the six holding portions 54 coincides with the opening 36 of the slot 35 is 60 degrees, and the latter is smaller than the former.

The holding portions 54 are not necessarily grooves and may be through holes. In a case where the holding portions 54 are through holes, it is necessary to pass the impact energy absorbing wire 4B through the through holes over substantially the entire length, which requires time and effort for assembling. In contrast, the holding portions 54 are grooves in the present embodiment, and thus the holding portions 54 can be easily formed as compared with a case in which the holding portions 54 are through holes. Moreover, the impact energy absorbing wire 4B can be inserted into the holding portion 54 from the outside in the radial direction of the flange 53, and thus the impact energy absorbing wire 4B can be easily attached to the holding portion 54.

In the present embodiment, the head portion 43 of the impact energy absorbing wire 4B includes the coming-off prevention portion 44, and thus the impact energy absorbing wire 4B is prevented from being detached from the holding portion 54 in the axial direction. Therefore, the impact energy absorbing wire 4B can be reliably pulled out from the opening 36 by the relative rotation between the winding drum 3 and the locking base 4D.

<Modification>

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

For example, the number of slots 35 provided in the winding drum 3 may be one or three or more. In addition, in a case where the number of slots 35 is plural, the number of impact energy absorbing wires 4B may also be plural. In this case, the number of impact energy absorbing wires 4B may be the same as or less than the number of slots 35.

The impact energy absorbing member 4A is not limited to the torsion bar as long as the impact energy is absorbed during the relative rotation between the winding drum 3 and the locking base 4D. For example, the impact energy absorbing member 4A may be a wire and the like that are bent and deformed by the relative rotation between the winding drum 3 and the locking base 4D to absorb the impact energy.

The configuration of the locking base 4D may be changed as appropriate. For example, the drive wheel 5 may be integrated with the first base member 7 of the locking base main body 6. Alternatively, the locking base 4D may include a separate member located on a winding drum 3 side with respect to the drive wheel 5, and the separate member may be provided with three or more holding portions 54. On the other hand, in a case where the drive wheel 5 includes three or more holding portions 54 as in the above embodiment, a retractor in the axial direction of the winding drum 3 can be reduced in dimension as compared with a case in which the locking base 4D includes a member including the holding portion 54 separately from the drive wheel 5. Moreover, with the configuration in which the drive wheel 5 includes the holding portions 54, the number of components does not increase and the backlash between the components is small, and thus an energy absorption load is stabilized.

The pretensioner 1C and the drive wheel 5 may be omitted. In this case, the first base member 7 may be provided with a flange facing the first end surface 31 of the winding drum 3, and the flange may be provided with three or more holding portions 54. In addition, in a case where there is no pretensioner 1C, the opening 21a of the first side wall 21 of the housing 2 has the internal teeth 11b formed on a circumferential edge of the opening 21a, and the lock member 61 may be engaged with the internal teeth 11b in an emergency of a vehicle.

Furthermore, the locking base 4D may be formed with external teeth, and a lock member that is engaged with the external teeth may be provided on the first side wall 21 of the housing 2.

CONCLUSION

As a first aspect, the present disclosure provides a seat belt retractor including: a housing including a pair of side walls facing each other; a winding drum configured to wind up a webbing, the winding drum being housed between the pair of side walls so as to be rotatable in a winding direction and a pull-out direction of the webbing, the winding drum having a center hole opened on at least a first end surface of the winding drum; a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum; an impact energy absorbing member including one end side coupled to the winding drum and the other end side coupled to the locking base, the impact energy absorbing member connecting the winding drum and the locking base so as to be integrally rotatable, in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base; at least one impact energy absorbing wire housed in at least one slot that is provided in the winding drum so as to form an opening in the first end surface of the winding drum, a head portion of the at least one impact energy absorbing wire that protrudes from the opening of the slot being attached to the locking base, the at least one impact energy absorbing wire being configured to be pulled out from the opening while being plastically deformed in a case where the winding drum and the locking base are relatively rotated, so as to absorb the impact energy; and a stopper member being held in the center hole of the winding drum without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy, in which the locking base includes three or more holding portions that are separated from each other in a circumferential direction around a rotation center of the winding drum, the number of the holding portions is larger than the number of slots, and the head portion of the at least one impact energy absorbing wire is attached to at least one of the holding portions.

According to the above configuration, the locking base includes the holding portions for the impact energy absorbing wire in a number larger than the number of slots, and thus it is possible to select which holding portion the impact energy absorbing wire is attached to. Moreover, the three or more holding portions are provided, and thus an attachment angle of the locking base with respect to the winding drum can be changed at an angle of less than 180 degrees (when the holding portions have uniform angular intervals, the angle is 120 degrees, 90 degrees, 60 degrees, and the like). In other words, by selecting the holding portion to which the impact energy absorbing wire is to be attached, an initial position of the stopper member can be adjusted at pitches corresponding to the angular intervals of the holding portions. Therefore, a pull-out amount of the webbing at the time of absorbing the impact energy can be finely adjusted.

As a second aspect, according to the first aspect, the locking base may include a flange facing the first end surface of the winding drum, and the holding portions may be grooves opened outward in a radial direction, the grooves being provided in the flange. According to the configuration, the holding portions can be easily formed as compared with a case in which the holding portions are through holes. Moreover, the impact energy absorbing wire can be inserted into the holding portion from the outside in the radial direction of the flange, and thus the impact energy absorbing wire can be easily attached to the holding portion.

As a third aspect, according to the first aspect or the second aspect, the head portion of the at least one impact energy absorbing wire may include a coming-off prevention portion having a width larger than that of the groove, the coming-off prevention being located on a side opposite to the winding drum with respect to the flange. According to the configuration, the impact energy absorbing wire is prevented from coming off from the holding portion in the axial direction, and thus the impact energy absorbing wire can be reliably pulled out from the opening by the relative rotation between the winding drum and the locking base.

As a fourth aspect, according to any one of the first to third aspects, the locking base may include a locking base main body and a drive wheel attached to the locking base main body, the seat belt retractor further includes a pretensioner configured to rotate the winding drum in the winding direction via the drive wheel, the locking base main body, and the impact energy absorbing member in the emergency of the vehicle, and the three or more holding portions may be provided in the drive wheel. According to the configuration, a retractor in the axial direction of the winding drum can be reduced in dimension as compared with a case in which the locking base includes a member having the holding portion separately from the drive wheel.

As a fifth aspect, according to any one of the first to fourth aspects, for example, the stopper member is configured to be inserted into the center hole in a plurality of attachment postures in which the stopper member is rotated at a predetermined angular interval, and the three or more holding portions may be separated from each other at an angular interval smaller than the predetermined angular interval.

What is claimed is:

1. A seat belt retractor comprising:
   a housing including a pair of side walls facing each other;
   a winding drum configured to wind up a webbing, the winding drum being housed between the pair of side walls so as to be rotatable in a winding direction and a pull-out direction of the webbing, the winding drum having a center hole opened on at least a first end surface of the winding drum;
   a locking base disposed to face the first end surface of the winding drum, the locking base being prevented from being rotated in the pull-out direction, in an emergency of a vehicle, a male screw being formed on an outer circumferential surface of a shaft portion, of the locking base, coaxial with the winding drum;
   an impact energy absorbing member including one end side coupled to the winding drum and the other end side coupled to the locking base, the impact energy absorbing member connecting the winding drum and the locking base so as to be integrally rotatable, in a normal state, and the impact energy absorbing member being configured to be plastically deformed in a case where a pull-out force of the webbing exceeds a predetermined value in a state where the locking base is prevented from being rotated in the pull-out direction, so as to absorb impact energy while allowing relative rotation between the winding drum and the locking base;
   at least one impact energy absorbing wire housed in at least one slot that is provided in the winding drum so as to form an opening in the first end surface of the winding drum, a head portion of the at least one impact energy absorbing wire that protrudes from the opening of the slot being attached to the locking base, the at least one impact energy absorbing wire being configured to be pulled out from the opening while being plastically deformed in a case where the winding drum and the locking base are relatively rotated, so as to absorb the impact energy; and
   a stopper member being held in the center hole of the winding drum without being rotatable relative to the winding drum and so as to be movable in an axial direction of the winding drum, the stopper member being screwed onto the male screw of the locking base, and the stopper member being configured to define an allowable amount of relative rotation between the winding drum and the locking base in a case where the impact energy absorbing member absorbs the impact energy,
   wherein the locking base includes three or more holding portions that are separated from each other in a circumferential direction around a rotation center of the winding drum,
   the number of the holding portions is larger than the number of slots, and
   the head portion of the at least one impact energy absorbing wire is attached to at least one of the holding portions.

2. The seat belt retractor according to claim 1,
   wherein the locking base includes a flange facing the first end surface of the winding drum, and
   the holding portions are grooves opened outward in a radial direction, the grooves being provided in the flange.

3. The seat belt retractor according to claim 2,
   wherein the head portion of the at least one impact energy absorbing wire includes a coming-off prevention portion having a width larger than that of the groove, the coming-off prevention portion being located on a side opposite to the winding drum with respect to the flange.

4. The seat belt retractor according to claim 1,
   wherein the locking base includes:
     a locking base main body; and
     a drive wheel attached to the locking base main body,
   the seat belt retractor further includes a pretensioner configured to rotate the winding drum in the winding direction, via the drive wheel, the locking base main body, and the impact energy absorbing member, in the emergency of the vehicle, and
   the holding portions are provided in the drive wheel.

5. The seat belt retractor according to claim 1,
   wherein the stopper member is configured to be inserted into the center hole in a plurality of attachment postures in which the stopper member is rotated at a predetermined angular interval, and
   the holding portions are separated from each other at an angular interval smaller than the predetermined angular interval.

* * * * *